April 21, 1925.  1,534,246

F. PORSCHE

LOCKING DEVICE FOR ADJUSTABLE VALVES

Filed Nov. 30, 1923

Inventor

Ferdinand Porsche

Patented Apr. 21, 1925.

1,534,246

UNITED STATES PATENT OFFICE.

FERDINAND PORSCHE, OF STUTTGART-UNTERTURKHEIM, WURTTEMBERG, GERMANY, ASSIGNOR TO DAIMLER-MOTOREN-GESELLSCHAFT, OF STUTTGART-UNTERTURKHEIM, WURTTEMBERG, GERMANY, A CORPORATION OF GERMANY.

LOCKING DEVICE FOR ADJUSTABLE VALVES.

Application filed November 30, 1923. Serial No. 677,754.

*To all whom it may concern:*

Be it known that I, FERDINAND PORSCHE, a citizen of the Republic of Czechoslovakia, residing at Stuttgart-Unterturkheim, Wurttemberg, Germany, Mercedesstrasse 53, have invented certain new and useful Improvements in Locking Devices for Adjustable Valves, of which the following is a specification.

This invention relates to a locking device for adjustable valves; more especially it relates to a locking device for the adjusting members of adjustable valves, especially such as are commonly found in internal combustion engines. With valve-gears of the kind where the control shaft acts directly on the valve plate forming the head of the entire valve, the distance between said plate and the control cam is rendered adjustable generally by having the said plate screwed into the valve-body which is made hollow for this purpose. The screw-connection between the said plate and the valve-body renders necessary a locking appliance by which a rotary motion of one of the two parts relatively to the other is prevented.

The locking appliances employed hitherto for the purpose stated are complicated, and possessed especially of the drawback that they increase very considerably the weight of the valve.

The present invention consists in locking the valve parts mentioned by means of the valve spring itself, without the use of any other part or parts than such pertaining already to the valve. It is hereby rendered possible to release the locking device without the aid or means specially provided for this purpose, and the release is effected in a very simple manner by disconnecting the valve stem and the valve spring by depressing this latter.

Figure 1:
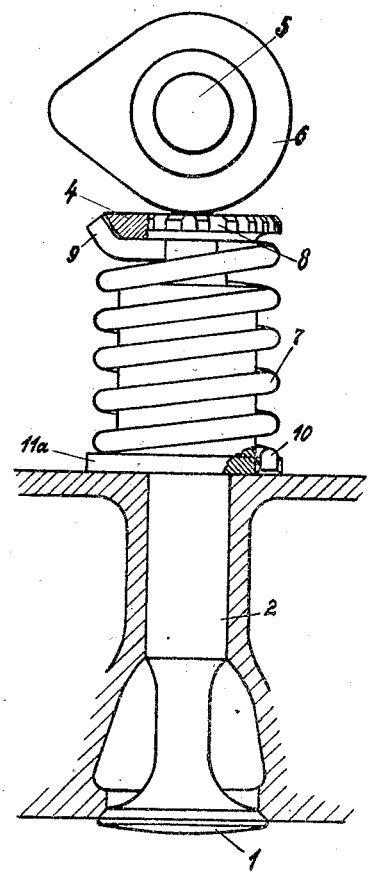
Figure 2:
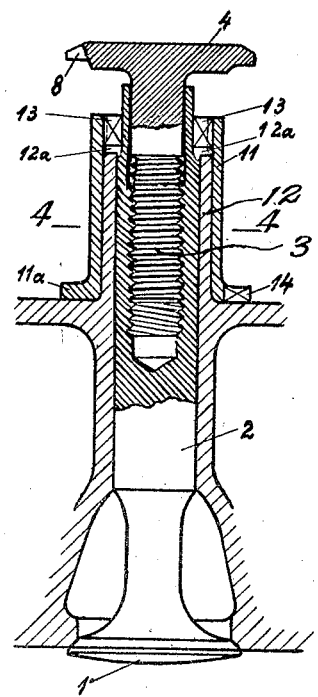
Figure 3:
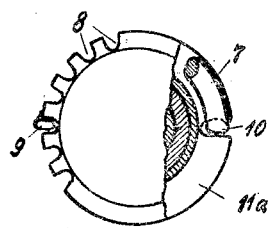
Figure 4:
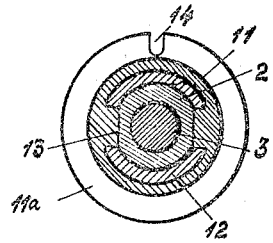

My invention is illustrated by way of example in the accompanying drawing in which Figure 1 is a side-view of the device, the valve casing and a few other parts being shown in section; Figure 2 is an axial section of the entire device, the cam shown in the upper part of Figure 1 being, however, omitted; Figure 3 is a plan of the device (also without the cam), partly in horizontal section; and Figure 4 is a horizontal section in the plane 4—4 of Figure 2.

The upper part of the stem 2 of the valve-disk 1 is provided with a threaded bore into which is screwed the stem 3 of the valve-plate or head 4, whereby it is rendered possible to vary and adjust the distance between said plate or head and the cam 6 which latter is affixed to the control shaft 5. It is necessary to fit the plate 4 against independent rotation as otherwise the possibility exists that the distance between the parts 4 and 6 unintentionally alter whereby the adjustment is rendered useless.

In order to prevent such an occurrence the upper end 9 of the valve spring 7 is bent off so as to form a kind of hook which engages one of the gaps between teeth 8 projecting radially outward from the valve plate 4. The other end 10 of the spring engages a recess 14 provided in the flange 11$^a$ of a sleeve 11 which is held against independent rotary motion by inner lugs 13 engaging recesses 12$^a$ provided in the stationary guide sleeve 12 for the stem 2, the latter is in this way also prevented from rotating independently as the inner faces of the lugs 13 lie flush with flattened parts of the circumferential surface of the stem (Figure 4).

Because of the fact that the spring 7 is utilized as a locking member for the valve plate 4 it is possible to make the stem guide sleeve 12 of considerable greater length than has heretofore been possible. That is to say, in existing arrangements in which two contacting discs, each fastened upon a section of a divided valve spindle and engaging the customary support, are used for securing said valve sections, the guide sleeve, such as 12, is shorter when the distance between the valve plate and the upper edge of the cylinder corresponds to the distance between the valve plate 4 and the upper edge of the cylinder in the present construction. If, in such existing constructions, a guide sleeve of the same length as the guide sleeve 12 is desired, it is necessary to increase the distance between the valve plate and the upper edge of the cylinder to an extent corresponding to the thickness of the aforesaid discs. This however materially increases the weight of the valve and renders it useless in connection with high speed engines. This objection is avoided in the present invention.

The valve-gear can be re-adjusted by inserting the spring end 9 into another of the gaps between the teeth 8 which is effected by compressing the spring so as to cause its end 9 to leave the gap in which it has been retained, when the valve-plate 4 can be turned in one or the other directions, as required, and the spring end 9 will then be re-inserted into the gap lying just at its side. It is, thus, for the purpose of re-adjustment that the plate 4 is provided with a plurality of teeth such as 8 or the like, or with the gaps between said teeth respectively.

I claim:

1. A locking device for the adjusting members of adjustable valves, comprising, in combination, a valve stem having a threaded bore, a threaded stem screwed into said bore, a plate rigidly connected with the free end of said second stem and forming the head of the valve, a spring so arranged as to be adapted to lift said plate, means for coupling the spring end which is adjacent to the said plate with latter to resist independent rotation of said plate and the second stem, and means preventing independent rotation of said spring, as set forth.

2. A locking device for the adjusting members of adjustable valves, comprising, in combination, a valve stem having a threaded axial bore. a threaded stem screwed into said bore, a plate rigidly connected with the free end of said second stem and forming the head of the valve; a cylindrical spring located between said plate and a stationary support and being adapted to lift said plate with its stem and the first-mentioned stem, means for coupling one end of said spring with said plate to prevent independent rotation of the latter and said second stem and means for coupling the other end of the said spring with said stationary support, as set forth.

3. A locking device for the adjusting members of adjustable valves, comprising, in combination, a valve stem having a threaded axial bore, a threaded stem screwed into said bore, a plate rigidly connected with the free end of said second stem and forming the head of the valve; a cylindrical spring located between said plate and a stationary support and being adapted to lift said plate with its stem and the first-mentioned stem and engaging with one of its ends said valve-plate and being coupled at its other end with a stationary member, the said valve-plate being adapted to be adjusted in various positions relatively to and to be coupled with, the said spring, as set forth.

4. A locking device for the adjusting members of adjustable valves, comprising, in combination, a valve stem having a threaded axial bore, a threaded stem screwed into said bore, a plate rigidly connected with the free end of said second stem and forming the head of the valve; a guide member for the first-mentioned valve-stem; a stationary sleeve surrounding said guide-member; a spring surrounding said sleeve and contacting at one of its ends with said valve-plate and at its other end with the foot of the said sleeve, and means to couple the two ends of said spring with their adjacent parts, as set forth.

5. A locking device for the adjusting members of adjustable valves, comprising, in combination, a valve stem having a threaded axial bore, a threaded stem screwed into said bore, a plate rigidly connected with the free end of the second stem and forming the head of the valve; a guide member for the first-mentioned valve-stem, and a recess therein; a stationary sleeve surrounding said guide-member, and an internal lug projecting through said recess and contacting with the first-mentioned stem; a spring surrounding said sleeve and contacting at one of its ends with said valve-plate and at its other end with the foot of said sleeve, and means to couple the two ends of said spring with their adjacent parts, as set forth.

6. A locking device for the adjusting members of adjustable valves, comprising, in combination, a valve stem having a threaded axial bore and two oppositely located flat faces near the end of its circumferential surface; a threaded stem screwed into said bore; a plate rigidly connected with the free end of said second stem and forming the head of the valve; a guide member for the first-mentioned valve-stem, and two oppositely located recesses therein; a stationary sleeve surrounding said guide-member, and internal lugs projecting through said recesses and contacting with the flat faces of the first-mentioned stem; a spring surrounding said sleeve and contacting at one of its ends with said valve-plate and at its other end with the foot of the said sleeve, and means to couple the two ends of said spring with their adjacent parts, as set forth.

7. A locking device for the adjusting members of adjustable valves, comprising, in combination, a valve stem having a threaded axial bore and two oppositely located flat faces near the end of its circumferential surface; a threaded stem screwed into said bore; a plate rigidly connected with the free end of said second stem and forming the head of the valve; said plate being provided with a plurality of recesses; a guide member for the first-mentioned valve-stem, and two oppositely located recesses therein; a stationary sleeve surrounding said guide-member, and provided, in its foot, with a recess and internal lugs projecting through said recesses and contacting with the flat faces of the first-mentioned stem; a cylindrical spring surrounding said sleeve and engaging with one of its ends one of said plurality of recesses provided in the said valve-plate, and with its other end said recess in the foot of the said sleeve, substantially as described.

8. The combination of a support, a mechanically operated valve, a stem mounted in said support and carrying said valve, a second stem connected with said first stem and rotatable relatively thereto for purposes of adjustment, a member fixed upon said second stem, and a spring engaging said member for operating said valve in one direction, one of the ends of said spring being in fixed connection with said support to hold the spring against independent rotation and the other end of said spring being detachably connected with said member to prevent independent rotation of the latter and said second stem relatively to said first stem.

In testimony whereof I affix my signature in presence of two witnesses.

FERDINAND PORSCHE.

Witnesses:
  JARVAN BAUER,
  HOWARD TAYLOR.